March 28, 1933. F. HUMER 1,902,999
AUTOMOBILE BODY
Filed July 3, 1929 6 Sheets-Sheet 1

Inventor
Frank Humer
By Blackmore, Spencer & Hush
Attorneys

Inventor
Frank Humer

March 28, 1933.  F. HUMER  1,902,999
AUTOMOBILE BODY
Filed July 3, 1929  6 Sheets-Sheet 4

March 28, 1933.   F. HUMER   1,902,999
AUTOMOBILE BODY
Filed July 3, 1929   6 Sheets-Sheet 5

Inventor
Frank Humer
By Blackmore, Spencer & Flick
Attorneys

March 28, 1933. F. HUMER 1,902,999
AUTOMOBILE BODY
Filed July 3, 1929 6 Sheets-Sheet 6

Inventor
Frank Humer

Patented Mar. 28, 1933

1,902,999

UNITED STATES PATENT OFFICE

FRANK HUMER, OF DETROIT, MICHIGAN, ASSIGNOR TO GENERAL MOTORS CORPORATION, OF DETROIT, MICHIGAN, A CORPORATION OF DELAWARE

AUTOMOBILE BODY

Application filed July 3, 1929. Serial No. 375,781.

This invention relates to automobile body construction and has particular reference to improvements in certain details of the body.

The improvements relate particularly to the door posts at the wind shield and at the center of the body as well as the post at the middle of the windshield to support windshields of the V-type. The improvements are also concerned with the joint between the permanent top and a collapsible rear portion and also with an improved rear seat built into the automobile body.

The front door or windshield post is hollow and is composed of a single piece of metal suitably bent to form shoulders against which the door and windshield are adapted to strike. Each post has an upper rearwardly bent flange which is secured to the stringers or framework of the top, and lower flanges secured to the body sill. Between the two front door posts at the top and bottom of the windshield, cross braces are applied which are provided with flanged or bent ends which project into and are secured to the posts. Brackets are also provided at the bent ends and secured to both cross braces and hollow posts.

The windshield is in two portions and V-shaped and at the center of the windshield or at the apex of the V a post is provided which has a pair of shoulders adapted to receive the swinging windshields, and with oppositely flanged top and bottom portions which are secured to the top and bottom parts of the windshield frame. A cap over the rear portion of the post defines a hollow through which there extends the tubes for operating the usual windshield wiper and the electrical connections for the lighting system of the vehicle.

The center door posts are each composed of a pair of flat metallic diverging sides spaced apart at their narrowest portion by means of a metallic filler piece and both sides are rigidly secured to the filler piece by means of screws. The rear or wider part of each post has a wooden filler strip to form an attaching means for upholstery, etc., and to make a more rigid construction. A central window construction is built in between the posts.

Intermediate its length the metallic filler strip is provided with a wider part and over this wider part a striker plate is adapted to fit and is secured. The side members are cut away at the place where the striker plate is secured.

At the top and bottom of the metal door post the side members are laterally flanged and a plate is fitted thereover. The post is secured to the top header and to the body sill by suitable fastening means passing through the flanges and plate. At its lower portion the windshield posts are contructed similarly to the center door posts.

The vehicle of the invention has a collapsible rear portion and between the collapsible bow of the rear portion and the permanent bow of the top a novel form of waterproof joint is provided. The joint comprises a metallic drip channel secured to the sides and top of the stationary bow. The collapsible bow has suitably secured thereto in a groove a strip of sponge rubber which is adapted to strike against the channel when the collapsible portion is in closed or up position. The drip channel will imbed itself into the soft rubber and form a watertight joint.

The rear seat of the invention has a novel adjustable back. The back is secured to the frame of the vehicle by pivoting it at its upper portion. At its mid-portion it is provided with a handle having a screw threaded shank operated in a trunnioned nut secured to the vehicle frame work. The mid-portion of the seat is also provided with a pivoted arm rest which when in its upper position is flush with the upholstery of the seat, but when in its down position acts as an arm rest and exposes the handle which operates the shank to adjust the angle of inclination of the rear seat back.

Referring to the drawings the numeral 2 indicates an automobile body as a whole. The body comprises the tonneau portion 4, collapsible rear portion 8, center door top 6, center door post 10, front door or windshield posts 12, cowl 14, and windshield 16. The windshield 16 is preferably of V-type and includes the two windshield halves 18 and 20 supported at their middle by means of the post 22.

The center door post 10 comprises the flat metallic diverging side members 24 and 26 having a metallic filler piece 28 therebetween at the outermost or narrowest portion thereof. The filler piece and the side members are secured together by suitable means such as screws passing through the side pieces and into the filler piece. The rear or wider portion of the post 10 has secured thereto the wooden filler piece 29 to secure a more rigid construction and to enable the ready application of upholstery, wooden frame members, etc.

Figure 4:
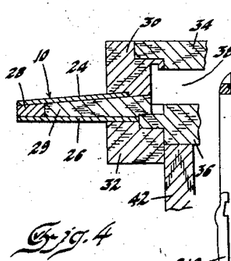
Fig. 4 is a sectional detailed view of the center door post taken substantially on the line 4—4 of Fig. 1.
Figure 5:
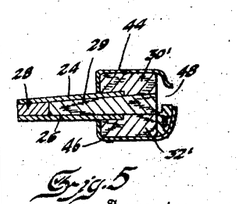
Fig. 5 is a section through the center door post on the line 5—5 of Fig. 1.

At the bottom of the post or at the front seat back each side of the post is provided with the fillers or finishing strips 30 and 32 which form a means to secure the side members 34 and 36 which form a well 38 for the reception of a slidable glass or window 40 at the middle of the vehicle. A side member 42 of the front seat is shown in Fig. 4. The structure of Fig. 4 is of course duplicated at the opposite side of the vehicle.

Figure 3:
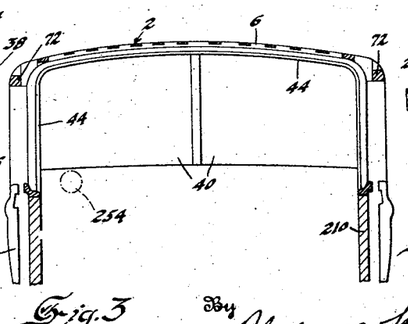
Fig. 3 is a transverse section through the middle of the vehicle taken through the rear doors and looking forward.

At the upper portion of the post 10 the filler strips 30 and 32 are somewhat more narrow than at the bottom of the post as shown at 30' and 32'. Over the strips 30' and 32' there are applied the metallic finishing strips 44 and 46 which are preferably chromium plated. By referring to Figs. 3 and 15 it will be noted that the chromium plated strip 44 extends up the two sides of the vehicle and across the top bow 47 and is made in a single piece. A glass channel or run is provided as shown at 48 in which the glass or window 40 is adapted to slide.

Figures 6, 7, 8, 9:
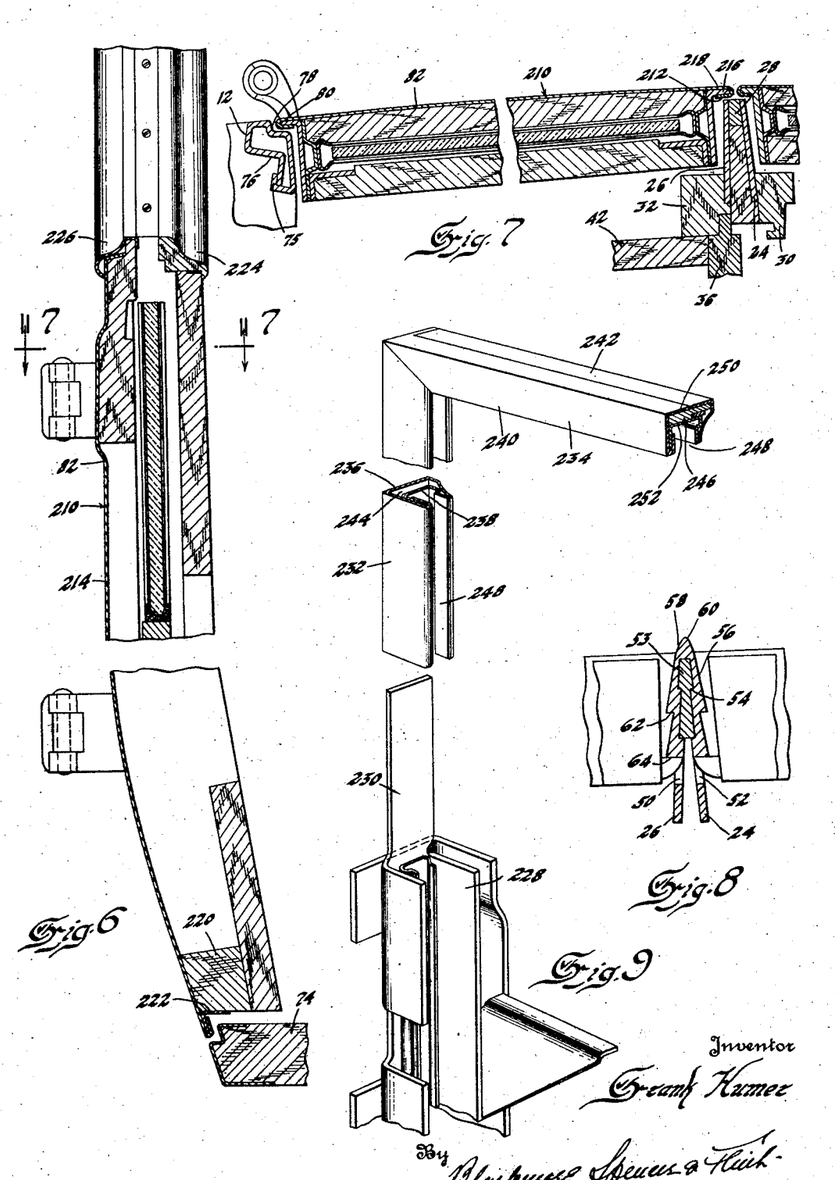
Fig. 6 is an enlarged sectional detail view through the lower portion of one of the doors taken on the line 6—6 of Fig. 1.
Fig. 7 is a section on the line 7—7 of Fig. 6.
Fig. 8 is a section on the line 8—8 of Fig. 1.
Fig. 9 is a perspective view of a modified form of door and window.

Intermediate the ends of the post 10 the sides 24 and 26 are cut away as shown at 50 and 52 in Fig. 8. At this cutaway portion the metallic filler piece 28 is enlarged as shown at 53 in Fig. 8. The enlarged portion 53 is provided with the shoulders 54 over which there is received the two side members 56 and 58 which form the striker plate for the door. The striker plate is pointed as indicated at 60 and is provided with the shoulders 62 and 64 in the usual way.

Figures 13, 15:
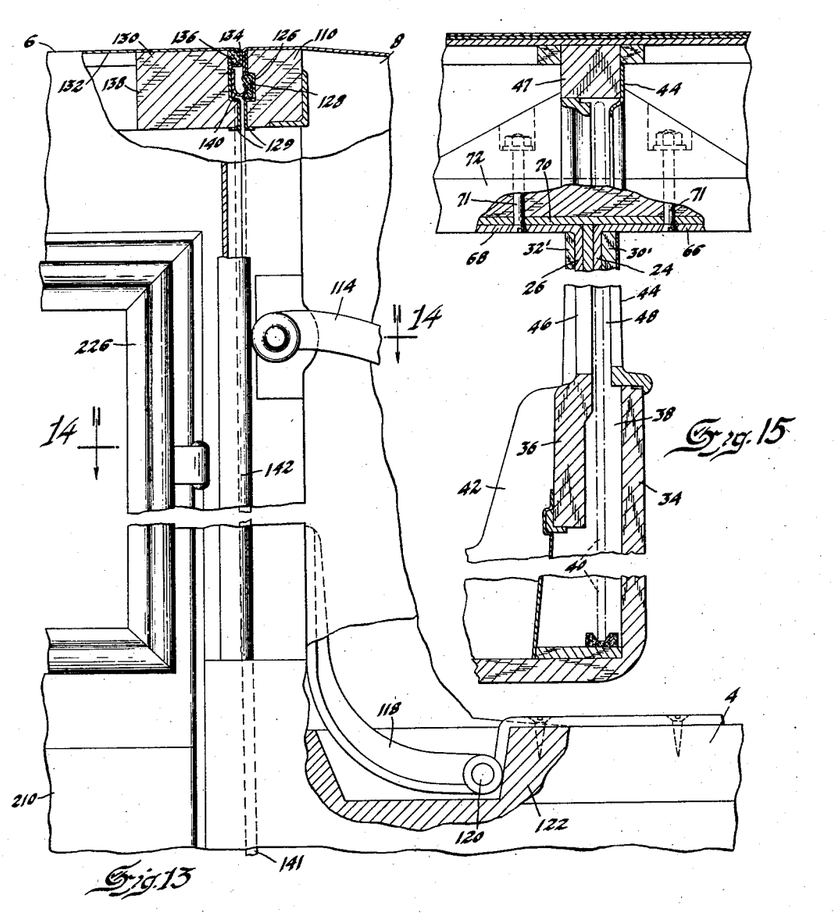
Fig. 13 is an enlarged detail view of the body at the connection between the permanent portion and the collapsible rear portion.
Fig. 15 is a sectional view on the line 15—15 of Fig. 2 with the upper portion of the door post shown in section.

By referring to Fig. 15, it will be noted that the upper portion of the side members 24 and 26 are right angularly flanged as indicated at 66 and 68 and over these flanges there is positioned the flat plate 70. Both the flanges and the plate are secured by suitable means such as screws or bolts 71 in the header 72 of the top 6. The structure is the same at the bottom of the post where the bent-over flanges and plate are secured to the sill 74.

Figure 11:
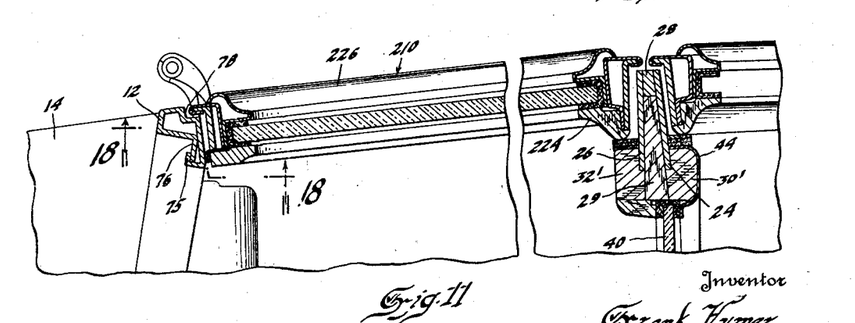
Fig. 11 is a section on the line 11—11 of Fig. 10.
Figure 18:
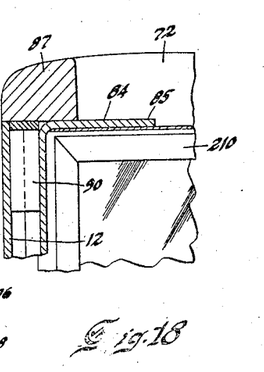
Fig. 18 is a sectional detail of the connection at the top of the front post taken on the line 18—18 of Fig. 11.

The front door or windshield posts 12 are each composed of a single piece or strip of metal as is shown in Figs. 7 and 11. The post is hollow and is shaped to the configuration shown in the figures mentioned and has its edges secured together as indicated at 75 as by welding. The edges project inwardly of the vehicle as shown in Fig. 7 and form a shoulder 76 against which the windshield halves 18 or 20 are adapted to strike. At its outer portion the post 12 is provided with the shoulder 78 adapted to receive the edge or flange 80 of the door 82. Each windshield post is hollow as shown and has its rearmost wall at the top bent rearwardly as shown at 84, Fig. 18, and secured in a cut out portion 85 of the header or stringer 72 of the top.

At the top and bottom of the windshield, cross braces 86 and 88 are provided, both of which have a suitable configuration and have their end portions bent as indicated at 90 for reception within the hollow portion of the posts 12. The upper brace 86 is secured to the upper cross header 87 while the lower brace 88 is secured to the cowl or lower cross bar 89 (see Fig. 10). A suitable opening is provided on the interior midportion of each post to allow for the reception of the ends 90 of the lower cross brace and at each angle or bend the braces are provided with the angle pieces 92 which also project into the hollow of the post and are secured to both post and cross braces 92. This forms a very rigid construction and serves to inter-lock all of the parts together.

Figure 17:
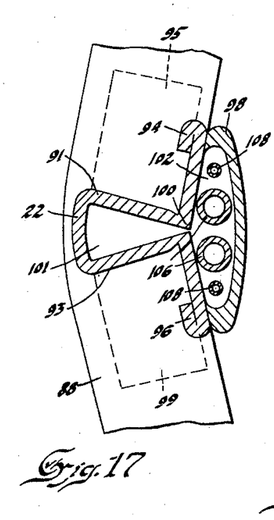
Fig. 17 is a section on the line 17—17 of Fig. 1.

The center windshield post 22 is formed of a single sheet of metal and is shaped to the configuration shown in Fig. 17. The post has the two wing portions 94 and 96 which form shoulders against which the swinging windshield halves 18 and 20, hinged as at 97, are adapted to strike. The upper and lower ends of the side portions 91 and 93 are flanged as at 95 and 99 to form a means to secure the post to the windshield frame and crossbraces. The flanges 95, 99 project through openings 101 in the top and bottom cross braces 86 and 88, and reinforcing plates 103 overlay and are secured to both flanges. Over the rear portion of the wings 94 and 96 the cap or cover plate 98 is secured. This cap 98 conceals the edge shown at 100 and also forms the channel or housing 102 in which there are received the tubes 106 to operate the windshield wiper and the electrical wiring 108.

Figure 10:
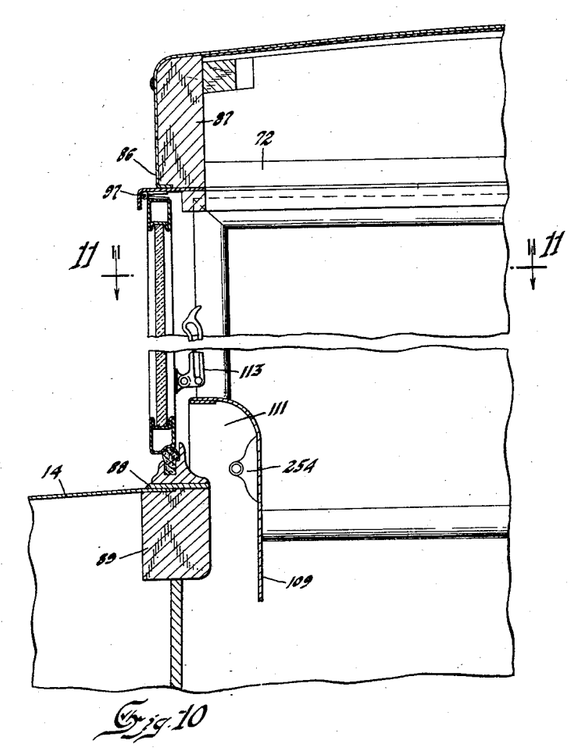
Fig. 10 is a section on the line 10—10 of Fig. 2.

The instrument board is shown at 109 in Fig. 10. The board is secured at its ends to the front posts 12 and cowl bar 89 and is spaced from the latter intermediate its length as shown at 111 to allow for ventilation. The linkage to hold the windshield in open position is shown at 113.

Figure 1:
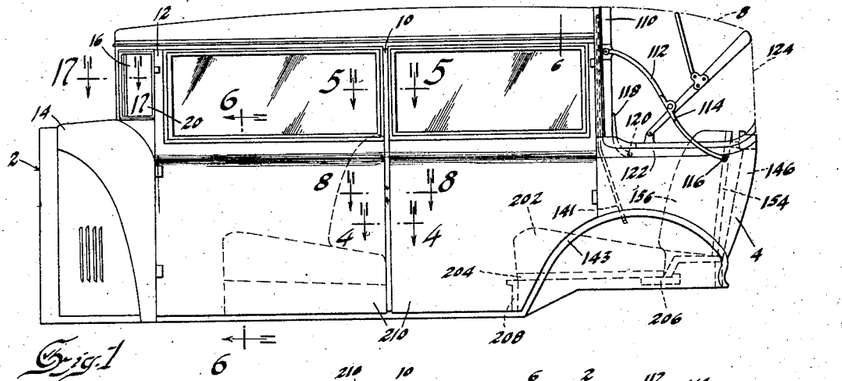
Fig. 1 is a side view of an automobile body constructed in accordance with the invention.
Figure 2:
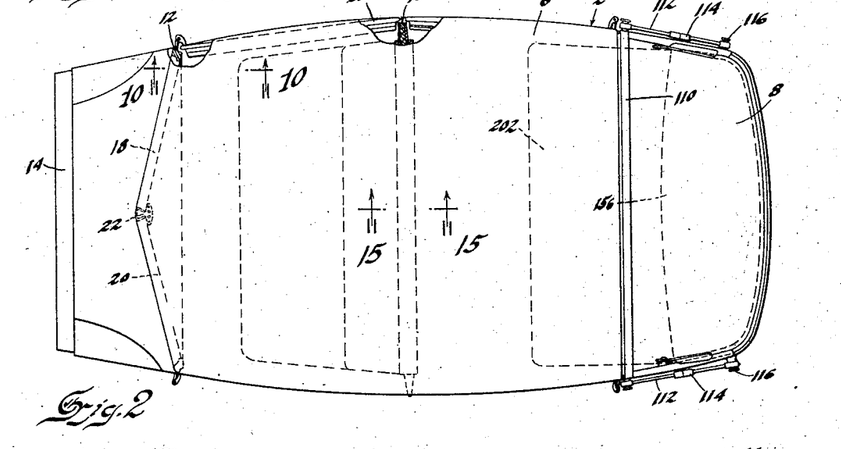
Fig. 2 is a plan view of the structure of Fig. 1 with parts shown in section to better illustrate certain features of the invention.
Figure 14:
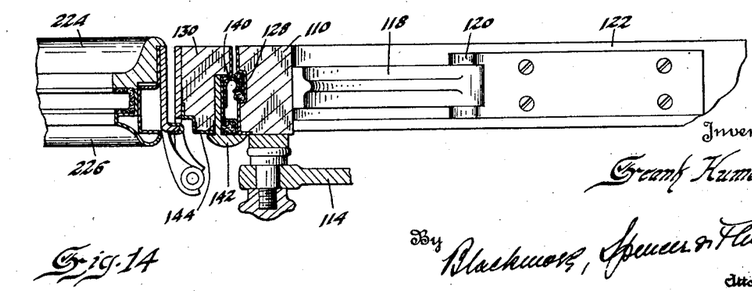
Fig. 14 is a section on the line 14—14 of Fig. 13.
Figure 16:
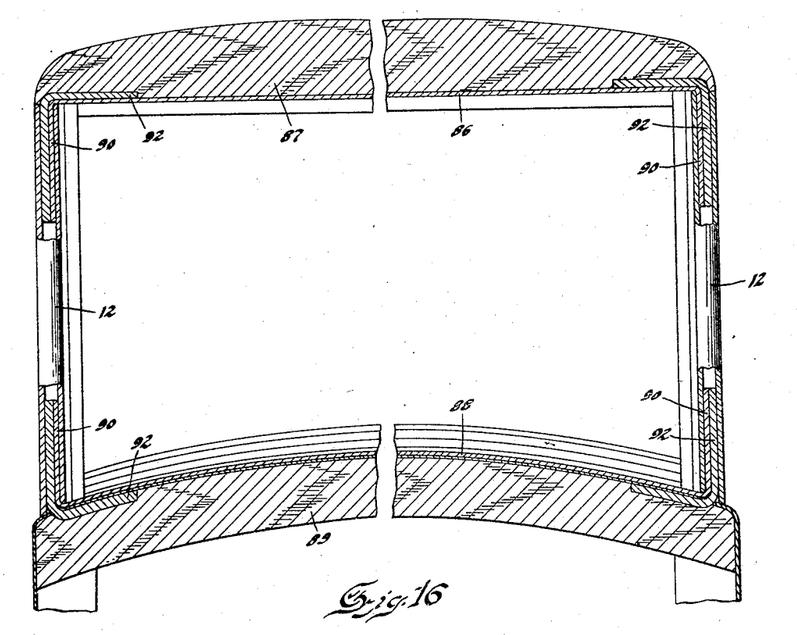
Fig. 16 is a sectional view through the body at the front windshield posts.

Referring to Figs. 1, 13 and 14, it will be noted that the collapsible rear portion 8 is provided with the bow 110 which has secured thereto the hinge member 118 pivoted as at 120 to the belt rail 122 of the body. The bow has secured thereto one arm 112 of the linkage 114 which holds the collapsible portion 8 in up position, while the opposite end of the linkage is pivoted to the body as at 116. The usual flexible covering 124 is provided over the collapsible portion 8. The bow 110 has the channel 126 which extends on both sides and across the top. The flexible covering 124 extends over the bow and into the channel, and over the flexible covering 124 in the channel 126 there is secured in any suitable way a strip of soft or sponge rubber 128.

The permanent top 6 has the rear permanent bow 130 which extends up both sides and across the top and conforms to the shape of the collapsible bow 110. The permanent top has the flexible covering 132 which extends rearwardly and overlaps the side of the bow 130 as shown at 134. A suitable soft or fabric packing 136 is positioned between a fabric covering 132 and the bow side 138 at the uppermost edge to secure a resilient connection between the two bows 110 and 130. In a shoulder formed on the bow side 138 there is secured the metallic drip channel 140 which has its channel portion shaped to conform to the position of the sponge rubber strip 128 in the grooves 126. When the parts are in the up-position as shown in Figs. 13 and 14 the projecting portion of the drip channel 140 strikes the soft rubber strip 128 and is embedded thereinto to form a water-tight joint. This joint extends up both sides and across the top as is seen in Figs. 13 and 14. Metallic facing strips or channels 129 are preferably provided at the inner lower adjacent edges of the bows 110 and 130.

By referring to Fig. 14 it will be noted that the structure at the side of the vehicle is slightly different in that a T-shaped finishing strip 142 is provided. The leg of the T is secured to the upwardly extending portion of the bow 130 and a welt or fabric strip 144 is secured to the T and to the bow to form a resilient connection between the two bows 110 and 130.

Figure 19:
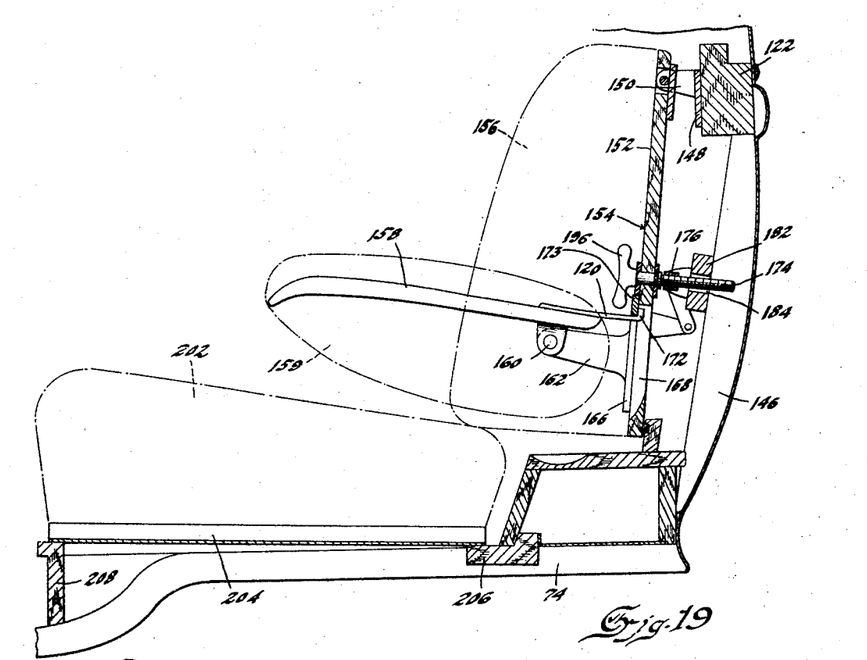
Fig. 19 is a sectional detail view through the rear end of the body showing the adjustable seat back.
Figures 20, 21:
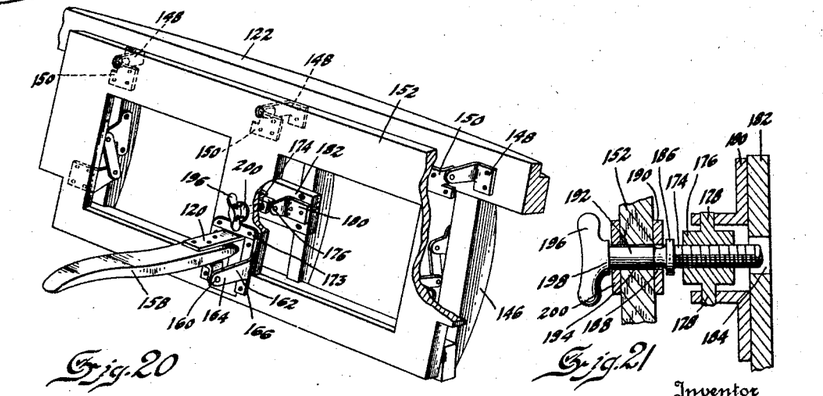
Fig. 20 is a perspective view of the adjustable seat back and the vehicle frame to which it is secured.
Fig. 21 is an enlarged detail view of a portion of the structure of Fig. 19.
Figure 22:
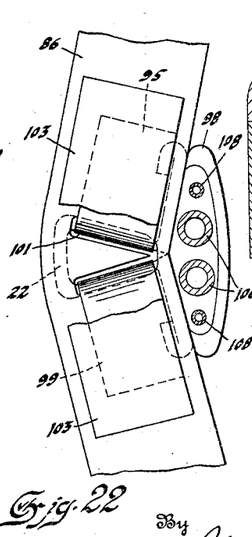
Fig. 22 is a plan view of the windshield post and its connections.

Referring to Figs. 19-21 inclusive, it will be seen that a novel form of the adjustable seat back has been provided for the rear seat. The frame work of the vehicle body is indicated at 146 and to this frame work the usual rear seat back 154 is customarily attached. In the present invention the belt rail 122 has secured thereto three brackets 148, (one at each side and one at the middle) to which there are hinged the brackets 150 secured to the frame 152 of the seat back 154. The seat back 154 includes the upholstery 156 and the center swingable arm rest 158, pivoted at 160 to brackets 162 secured to the frame portion 152. The brackets 162 include the ears or prongs 164, and the flat back portion 166. The frame 152 is provided with a slot or an opening 168 in which there is adapted to swing the arm 120 rigidly secured to the arm rest 158. The arm 120 has the hook end 172 which is adapted to engage behind the plate 173 secured to the frame 152. The engagement of the hook portion 172 with the plate 173 will limit the downward movement of the arm rest 158. When the arm rest 158 is swung from the position shown in Fig. 19 to its uppermost position, the upholstery 159 of the arm rest will conform to the upholstery 156 of the seat back to give a smooth or uniform surface over the back of the seat.

The seat back 154 is free at its lower end and is capable of being adjusted by means of the threaded shank 174 operating in the trunnioned nut 176. The nut 176 has the trunnions 178 at either side received in the brackets 180 mounted on the member 182 of the vehicle frame 146. The frame member 182 has the opening 184 to accommodate the shank 174. The shank has the ring 186 therearound and a groove or reduced portion 188 immediately beyond the ring. In the reduced portion 188 there is received the metallic plate 190 rigidly secured to the frame 152 of the rear seat back 154. A handle portion 192 projects through an opening 194 in the frame 152 and at its outer side is provided with the handle 196. The handle 196 has the shoulder 198 which abuts against a second plate 200 secured to the frame 152.

From an examination of Figs. 19 to 21, it will be apparent that as the handle 196 is turned in either direction, the seat back will be moved forwardly or rearwardly owing to the fact that the threaded shank 174 will be turned in the relatively stationary nut 176. It will also be noted that the arm rest 158 is swung not accessible until the position shown in Figs. 19 or 20. When the arm rest is in the up position the handle 196 is concealed.

The usual upholstered seat bottom is shown at 202, while 204 indicates the seat pan. The seat pan rests on the transverse frame members 206 and 208 supported on the usual sill 74.

The door of the invention is shown at 210 in Figs. 6, 7, 11 and 12. This door forms the subject matter of my copending application, Serial No. 370,933, filed June 14, 1929. The door includes the U-shaped metallic frame member 212 and the panelling 214 which is turned over the flange 216 at the door edge as indicated at 218. At its bottom the door is provided with the wooden frame member 220 to which there is secured the angle iron 222 over which the lower edge of the door is flanged.

Figure 12:
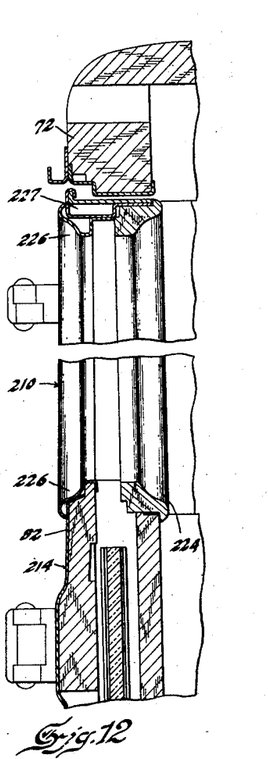
Fig. 12 is an enlarged sectional detail view through the door, the lower portion of which is shown in Fig. 6.

The door has the usual window opening at its upper portion and on the inner side the opening is provided with the finishing strip 224 which is adapted to rigidly hold the window in place. On its outer side the door is provided with the chromium plated reveal or finishing strip 226 secured in place in the manner described in the copending application. The panel 214 is inturned and spaced from the frame 212 at the window opening leaving a space 227 between frame and panel.

By referring to Fig. 9 it will be noted that a modified form of door and window frame is provided. The upper portion of the door is indicated at 228 and includes the upwardly extending blade or leaf 230. The door post at the opposite side of the door is similarly constructed and has a similar blade or leaf 230. The window frame is composed of the two lateral upright sections 232 and the top section 234. The upright sections 232 are formed of two interfitting channels 236 and 238, while the upper portion 234 is composed of the two side sections 240 and 242. The two channels 236 and 238 are secured together at their edges and define a space therebetween as indicated at 244 and in this channel the leaf or blade 230 is received. The channels may be secured to the leaf 230 by any suitable manner such as by screws, or if desired, no securing means need be applied for the reason that the friction between the plate 230 and the channel 244 is ample to hold the frame in place. This lack of application of securing means also renders the window frame readily removable from the door.

The two sections 240 and 242 of the upper portion are laterally assembled and are held together by means of the filler strip or piece 246. The strip 246 is preferably secured to the section 242 and after the glass has been put in place in the channels 248, the section 242 is applied by inserting the filler strip 246 in the space provided in the upper section 240. This space is defined by the flange 250 and 252 as shown in Fig. 9. Suitable screws are then applied through the flanges 250 and 252 into the filler strip 246 to rigidly hold the upper frame member 234 in position.

Suitable angle strips applied at the corners and fitting into the hollow portions of the upright sections 232 and of the transverse section 234 are suitably secured by means of solder or screws and hold the frame together.

A telephone receiver is shown at 254 built into the instrument board.

Pipes 141, shown in Figs. 1 and 13 extend from the bottoms or ends of the drip channel 140 to beneath the rear fenders 143 to carry off water from the drip channel.

If desired the doors may be hinged at their rear ends and the lower ends of the front door or windshield posts may be forwardly bent and positioned in a plane parallel to but forward of the windshield supporting portion. This will allow for a wider portion at the lower part of the door and afford additional leg room for entrance to and exit of passengers from the car.

I claim:

1. In a body construction for vehicles having a windshield, hollow door posts at opposite sides of said windshield, a cross brace extending between said posts, and bent ends on said brace received and secured in the hollow of said posts.

2. In a body construction for vehicles having a windshield, hollow door posts at opposite sides of said windshield, a cross brace extending between said posts, bent ends on said brace received and secured in the hollow of said posts, and angle braces at the intersection of said posts and cross brace extending into the posts and secured to both posts and cross brace.

3. In a body construction for vehicles having a windshield, hollow door posts at opposite sides of said windshield, a cross brace extending between said posts, bent ends on said brace received and secured in the hollow of said posts, a cross brace at the top of said posts extending therebetween, and bent ends on said brace received in the hollow of said posts.

4. In a body construction for vehicles having a windshield, hollow door posts at opposite sides of said windshield, a cross brace extending between said posts, bent ends on said brace received and secured in the hollow of said posts, a cross brace at the top of said posts extending therebetween, bent ends on said brace received in the hollow of said posts, and angle braces at the intersections of said posts and cross braces extending into the posts and secured to both posts and cross braces.

In testimony whereof I affix my signature.

FRANK HUMER.